(12) United States Patent
Chou

(10) Patent No.: US 8,233,084 B1
(45) Date of Patent: Jul. 31, 2012

(54) METHOD AND SYSTEM FOR DETECTING VIDEO FIELD PARITY PATTERN OF AN INTERLACED VIDEO SIGNAL

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 1205 days.

(21) Appl. No.: 11/953,468

(22) Filed: Dec. 10, 2007

Related U.S. Application Data

(60) Provisional application No. 60/869,481, filed on Dec. 11, 2006.

(51) Int. Cl.
*H04N 7/01* (2006.01)
(52) U.S. Cl. ......... 348/441; 348/452; 348/462; 348/701
(58) Field of Classification Search .................. 348/441, 348/448, 449, 452, 458, 462, 700–701
See application file for complete search history.

(56) References Cited

U.S. PATENT DOCUMENTS

| | | |
|---|---|---|
| 4,724,487 A | 2/1988 | Casey |
| 4,750,038 A | 6/1988 | Welles et al. |
| 4,757,385 A | 7/1988 | Hieda |
| 4,903,127 A | 2/1990 | Phillips |
| 6,340,990 B1 * | 1/2002 | Wilson .......................... 348/448 |
| 6,839,094 B2 | 1/2005 | Tang et al. |
| 6,850,694 B1 | 2/2005 | Moro et al. |
| 2005/0179814 A1 * | 8/2005 | Pau et al. ...................... 348/448 |
| 2007/0121001 A1 * | 5/2007 | Wang et al. ................... 348/452 |

* cited by examiner

*Primary Examiner* — Farzana Hossain
(74) *Attorney, Agent, or Firm* — Dergosits & Noah LLP; Joyce Tom

(57) ABSTRACT

Methods and systems are described for detecting a video field parity pattern in a video signal comprising a plurality of interlaced video fields, wherein each video field includes a plurality of pixels located in a plurality of positions in a plurality of scan lines. One method includes receiving pixel data of a plurality of current pixels in a current video field, and pixel data of a plurality of first pixels in a first previous video field, where the first previous video field immediately precedes the current video field and together form an image frame. The method continues by determining, for each of the plurality of current pixels in the current video field, a first and a second set of absolute differences between a current pixel in a current position in a current scan line and at least one first pixel in the current position in at least one vertically adjacent scan line relative to the current scan line, where the first and the second set of absolute differences is based on a first field parity pattern and a second field parity pattern, respectively. A first accumulated value based on a sum total of each of the first set of absolute differences and a second accumulated value based on a sum total of each of the second set of absolute differences are determined, and a correct field parity pattern of the current video field is determined based on the first accumulated value and the second accumulated value.

15 Claims, 7 Drawing Sheets

480i in NTSC 576i in PAL and SECAM 480i, 576i, and 1080i in MPEG2

With Correct Field Parity

With Incorrect Field Parity

FIG. 5A
FIG. 5B
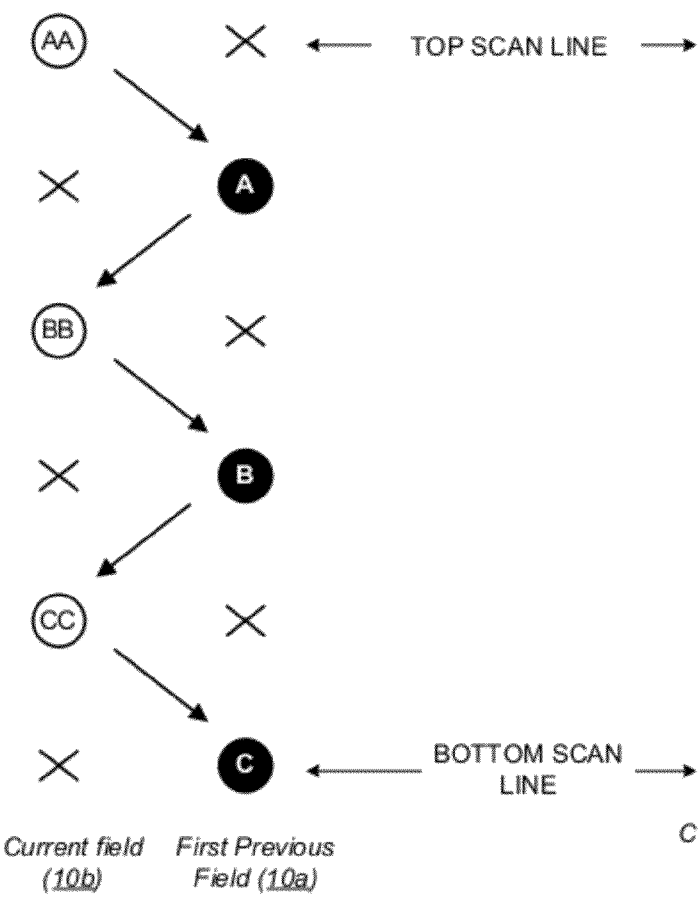
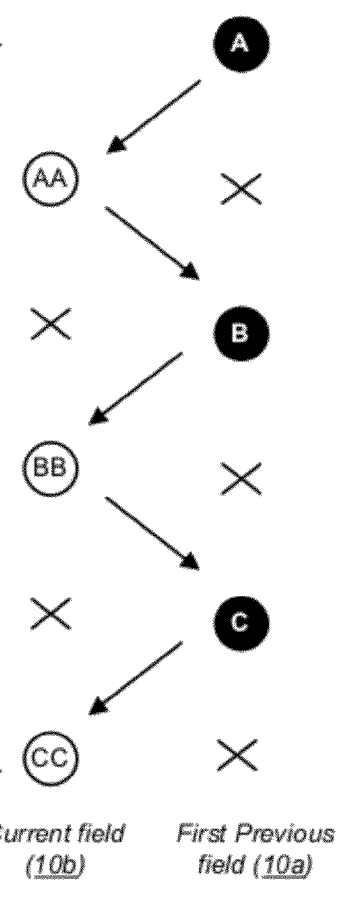
FPP₁
FPP₂
+ → −    Absolute Difference Calculation for Currently Chosen Field Parity Pattern
○    Available Pixels
✕    Unavailable Pixels

METHOD AND SYSTEM FOR DETECTING VIDEO FIELD PARITY PATTERN OF AN INTERLACED VIDEO SIGNAL

CROSS-REFERENCE TO RELATED APPLICATIONS

This application claims priority to a provisional application entitled "METHOD AND SYSTEM FOR AUTOMATIC DETECTION AND CORRECTION OF VIDEO FIELD PARITY FROM AN INTERLACED VIDEO SIGNAL," Ser. No. 60/869,481, filed Dec. 11, 2006, and herein incorporated in its entirety by reference.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

World wide video standards such as NTSC, PAL, and SECAM use interlaced video formats to maximize the vertical refresh rates while minimizing the required transmission bandwidth. The international digital video broadcast standards such as DVB-T and ATSC also use interlaced video formats to maximize the vertical refresh rates while minimizing the required transmission data rates. The international digital video standards such as ITU-R BT.601 and ITU-R BT.709 also define interlaced video formats such as 480i, 576i, and 1080i for transmission of digital video signals.

In an interlaced video format, depicted in FIG. 1A and FIG. 1B, an image frame 11 comprises at least two video fields 10a-10c. In each video field, e.g., 10a, a plurality of pixels 14 are arranged in scan lines 12a. The pixels 14 in one half of scan lines 12a of an image frame 11 are displayed on the screen during the first vertical scan period (i.e., a first video field 10a), while the pixels 14 in the other half of scan lines 12b, positioned halfway between those displayed during the first period, are displayed during a second vertical scan period (i.e., a second field 10b).

For example, in the NTSC video standard, a video field contains 262.5 scan lines, and 59.94 video fields are transmitted per second. A first video field begins with a full scan line of pixels, and ends with a left-hand half scan line containing the bottom of the image frame, as shown in FIG. 1C. An adjacent video field begins with pixels in a right-hand half scan line containing the top of the image frame and it ends with a full picture line of pixels. In PAL and SECAM standards, a video field contains 312.5 scan lines, and 50 video fields are transmitted per second. For interlaced video signals in PAL and SECAM (shown in FIG. 1D), the first field includes a right-hand half scan line containing the top line of the image frame, and ends with a full scan line, while the adjacent field starts with a full scan line, and ends with a left-hand half scan line that contains the bottom of the image frame. For these analog video standards, each video field contains scan lines for active video and for vertical blanking intervals.

In the digital 480i standard, a video field contains 240 scan lines, and 59.94 video fields are transmitted per second. In the digital 576i standard, a video field contains 288 scan lines, and 50 video fields are transmitted per second. For these digital video standards, each video field contains scan lines for active video only. For interlaced formats in MPEG-2 compressed video standard (shown in FIG. 1E), a video field is identified according to whether it contains the top or bottom scan line of the image frame. Top and bottom fields are displayed in the order that they are coded in an MPEG-2 data stream.

In the interlaced video format, each video field, e.g., 10b, has an associated field parity that indicates the relative vertical position among its scan lines 12b and those of its two temporally adjacent video fields, i.e., the previous 10a and subsequent 10c video fields. For a 2:1 interlaced video signal, as defined in various international video standards, each video field 10a-10c has an associated parity that is one of two possible parities, P1 and P2. In a normal situation, two temporally adjacent video fields 10a, 10b have opposite parities, so the scan lines 12a, 12b from the two video fields interlace with one other. For example, if the current video field 10b has parity P1, then both the previous 10a and subsequent 10c video fields should have parity P2, and vice versa.

Therefore, for any interlaced video signal, the two parities P1 and P2 alternate for each sequentially ordered video field. In normal operation, two field parity patterns (FPPs) associated with an interlaced video signal are possible. For example, a first FPP is represented by the following pattern:
2P1P2P1P2P1P2
while a second FPP is represented by the following pattern:
P2P1P2P1P2P1P2P1.

For purposes of this description, the two field parity patterns can be denoted as FPP1 and FPP2. Note that the definitions of the two field parity patterns are relative to one another. There is no absolute meaning for FPP1 or FPP2 to represent any one of the two possible field parity patterns for any interlaced video signal.

While using interlaced video formats can maximize the vertical refresh rates and minimize the required transmission bandwidth, visual artifacts such as line flicker and line crawling can also result. In an interlaced-to-progressive video format converter (i.e., a de-interlacer), the output of an interlaced input video signal is improved by converting the interlaced signal into a progressive (non-interlaced) format for display. Indeed, many modern display systems employing technologies newer than cathode-ray tube (CRT), such as liquid crystal display (LCD) and plasma display panel (PDP) systems, require an interlaced-to-progressive conversion before an image can be displayed.

Various methods exist for converting an interlaced signal to a progressive signal. Some techniques use simple spatial-temporal methods, e.g., line repetition (bob) and field insertion (weave). Other techniques are more complicated that use per-field and per-pixel motion-adaptive (MA) techniques and advanced motion compensated (MC) techniques. In all cases, however, in order to convert effectively an interlaced input video signal into a progressive video signal, accurate information relating to the field parity of each input video field is required.

During the transmission of an interlaced video signal in many cases, the field parity information is not explicitly transmitted with the video signal. Rather, the field parity information is typically embedded in the vertical and horizontal synchronization signals that are transmitted with the video signal. For example, in a NTSC, PAL, or SECAM analog video signal, a baseband luminance signal, a modulated chrominance signal, and vertical and horizontal synchronization signals are combined to form a composite video signal. In such cases, once the composite vertical and horizontal synchronization signal is extracted from the composite video signal, the field parity signal can be detected from the composite synchronization signal. In a YPbPr analog component video signal carrying an interlaced video format, the vertical and horizontal synchronization signals are usually mixed with the luminance (Y) signal to form the sync-on-luminance (SOY) signal. In such cases, the composite vertical and horizontal synchronization signal can be extracted from the sync-on-luminance (SOY) signal first so that the field parity signal can be detected from the composite synchronization signal.

During the transmission, reception, scan format conversion, and display of the interlaced video signal, the field parity of each interlaced video field must be correctly preserved or regenerated either explicitly through a dedicated field parity signal or implicitly through a field parity signal embedded in the vertical and horizontal synchronization signals. Nonetheless, the field parity information of the interlaced video signal often suffers errors and/or losses during this process. Moreover, the field parity information can also suffer errors or losses due to compatibility or interoperability problems among video devices designed and manufactured by different companies around the world. Furthermore, in addition to the problems described above, the field parity information of the interlaced video signal may be incorrectly assigned during production and/or mastering in the studio or broadcast stations. With the large volume of video program exchanges among different production sources of the programs, this problem is occurs more frequently than not.

Due to these serious problems, the field parity information of the interlaced video signal can be unreliable or even unavailable when the signal is received at the de-interlacer, the format converter, or other video processing functional block of a video display device. If not corrected, these errors or losses in the field parity information can cause highly objectionable visual artifacts such as saw teeth along sharp diagonal edges and horizontal stripes in vertically changing areas. For example, FIG. 2A and FIG. 2B depict images processed using the correct field parity (FIG. 2A) and the incorrect field parity (FIG. 2B), respectively. In FIG. 2A, the image is sharp and clear when the video fields are processed using the correct field parity. in contrast, the image in FIG. 2B has jagged edges (e.g., along the pier and between the boats) when the video fields are processing using the incorrect field parity. These visual artifacts are highly objectionable.

SUMMARY

Methods and systems are described for detecting a video field parity pattern in a video signal comprising a plurality of interlaced video fields, wherein each video field includes a plurality of pixels located in a plurality of positions in a plurality of scan lines. One method includes receiving pixel data of a plurality of current pixels in a current video field, and pixel data of a plurality of first pixels in a first previous video field, where the first previous video field immediately precedes the current video field and together form an image frame. The method continues by determining, for each of the plurality of current pixels in the current video field, a first and a second set of absolute differences between a current pixel in a current position in a current scan line and at least one first pixel in the current position in at least one vertically adjacent scan line relative to the current scan line, where the first and the second set of absolute differences is based on a first field parity pattern and a second field parity pattern, respectively. A first accumulated value based on a sum total of each of the first set of absolute differences and a second accumulated value based on a sum total of each of the second set of absolute differences are determined, and a correct field parity pattern of the current video field is determined based on the first accumulated value and the second accumulated value.

In another aspect, a system for detecting a video field parity pattern in a video signal comprising a plurality of interlaced video fields includes means for receiving pixel data of a plurality of current pixels in a current video field, and pixel data of a plurality of first pixels in a first previous video field, where the first previous video field immediately precedes the current video field and together form an image frame. The system also includes means for determining, for each of the plurality of current pixels in the current video field, a first and a second set of absolute differences between a current pixel in a current position in a current scan line and at least one first pixel in the current position in at least one vertically adjacent scan line relative to the current scan line, where the first and the second set of absolute differences is based on a first field parity pattern and a second field parity pattern, respectively. The system also includes means for determining a first accumulated value based on a sum total of each of the first set of absolute differences and a second accumulated value based on a sum total of each of the second set of absolute differences, and means for determining a correct field parity pattern of the current video field based on the first accumulated value and the second accumulated value.

In another aspect, a system for detecting a video field parity pattern in a video signal comprising a plurality of interlaced video fields includes at least two one line buffers configured for receiving pixel data of a plurality of current pixels in a current video field, and pixel data of a plurality of first pixels in a first previous video field, wherein the first previous video field immediately precedes the current video field and together form an image frame, an absolute difference calculation unit configured for determining, for each of the plurality of current pixels in the current video field, a first and a second set of absolute differences between a current pixel in a current position in a current scan line and at least one first pixel in the current position in at least one vertically adjacent scan line relative to the current scan line, where the first and the second set of absolute differences is based on a first field parity pattern and a second field parity pattern, respectively, an accumulation unit configured for determining a first accumulated value based on a sum total of each of the first set of absolute differences and a second accumulated value based on a sum total of each of the second set of absolute differences, and a field parity pattern detection unit configured for determining a correct field parity pattern of the current video field based on the first accumulated value and the second accumulated value.

DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and:

FIG. 5A and FIG. 5B depict relative positions of scan lines in adjacent video fields based on a first field parity pattern and a second field parity pattern, respectively, according to one embodiment.

DESCRIPTION

Figure 2A:
FIG. 2A and FIG. 2B are image frames processed using a correct field parity and an incorrect field parity, respectively, according to one embodiment.
Figure 2B:

A method and system for detecting the field parity pattern of an interlaced video signal is described. As stated above, the correct field parity pattern (FPP) of the interlaced video signal is either a first FPP or a second FPP. When the video fields of the interlaced video signal are processed using the correct FPP, objectionable visual artifacts, e.g., saw teeth and horizontal stripes, caused by improper processing based on the incorrect FPP, can be substantially reduced, as shown in FIG. 2A and FIG. 2B. It is known that visual artifacts, like saw teeth along sharp diagonal lines and horizontal stripes in vertically changing areas, are caused by significant differences between pixels in vertically adjacent scan lines in a video frame, and that when the difference between pixels in vertically adjacent scan lines is relatively small, such visual artifacts are substantially absent.

Based on these observations, the correct FPP of the interlaced video field is detected, in one embodiment, by analyzing differences between pixels in vertically adjacent scan lines in a video frame when a first FPP is assumed and when a second FPP is assumed. In one embodiment, absolute differences between pixels in vertically adjacent scan lines in temporally adjacent video fields are calculated assuming a first FPP and assuming a second FPP. The absolute difference values calculated assuming the first FPP are then accumulated and compared to the accumulated absolute difference values calculated assuming the second FPP. According to an exemplary embodiment, when one of the accumulated absolute difference values is significantly less than the other, the FPP associated with the significantly smaller accumulated absolute difference value is most likely the correct FPP of the interlaced video signal.

In this manner, the video FPP of the interlaced input video signal can be detected and corrected, if needed, so that the interlaced input video signal can be correctly processed and displayed substantially without saw teeth, horizontal stripes, and other artifacts due to incorrect video field parity processing. In one embodiment, field parity pattern detection and correction can be applied in cooperation with a de-interlacer, a format converter, and/or any other video processing functional block for the production, distribution, transmission, reception, scan format conversion, and display of the interlaced video signal.

Figure 3:
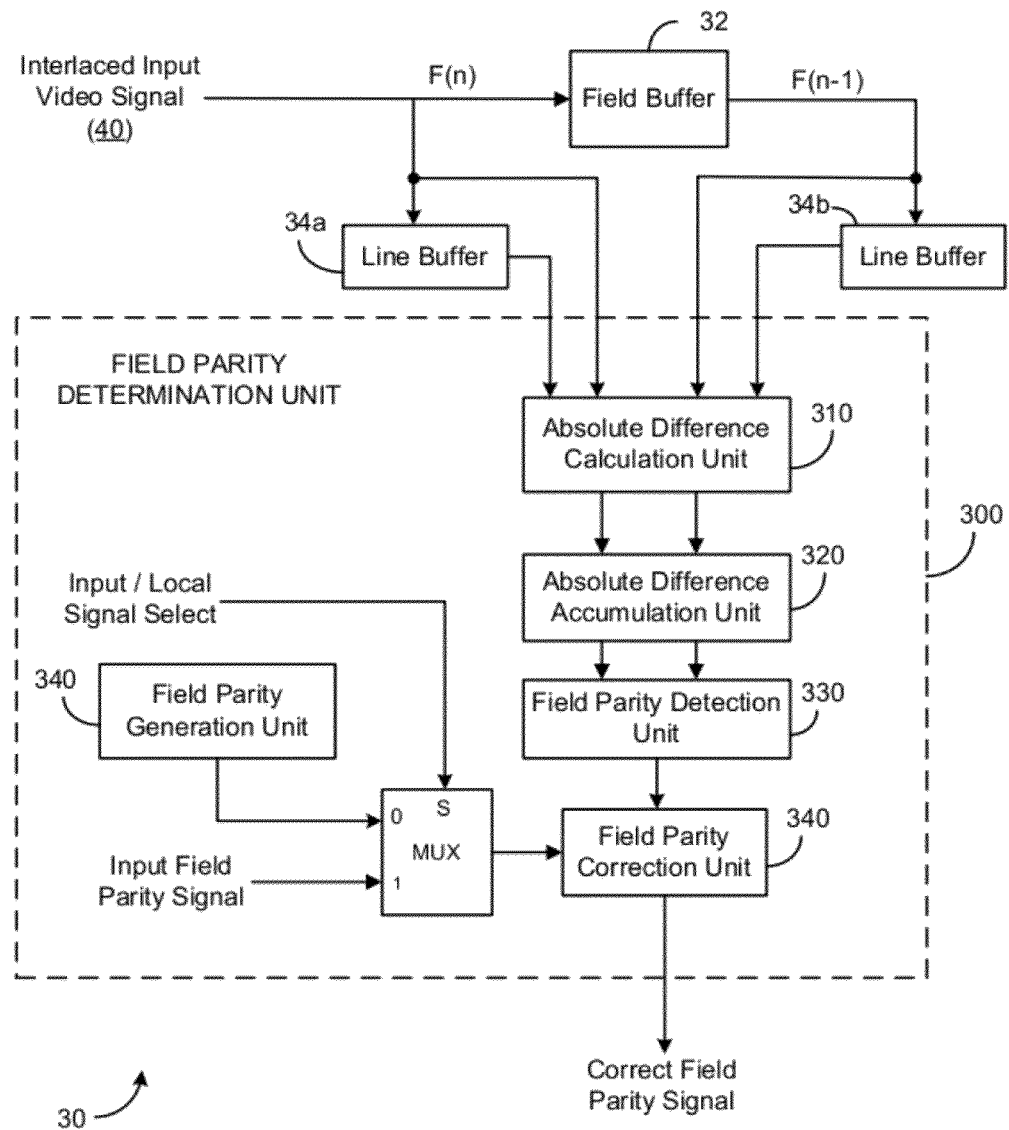
FIG. 3 is a block diagram depicting an exemplary system for detecting a video field parity pattern in a video signal according to one embodiment.
Figure 4:
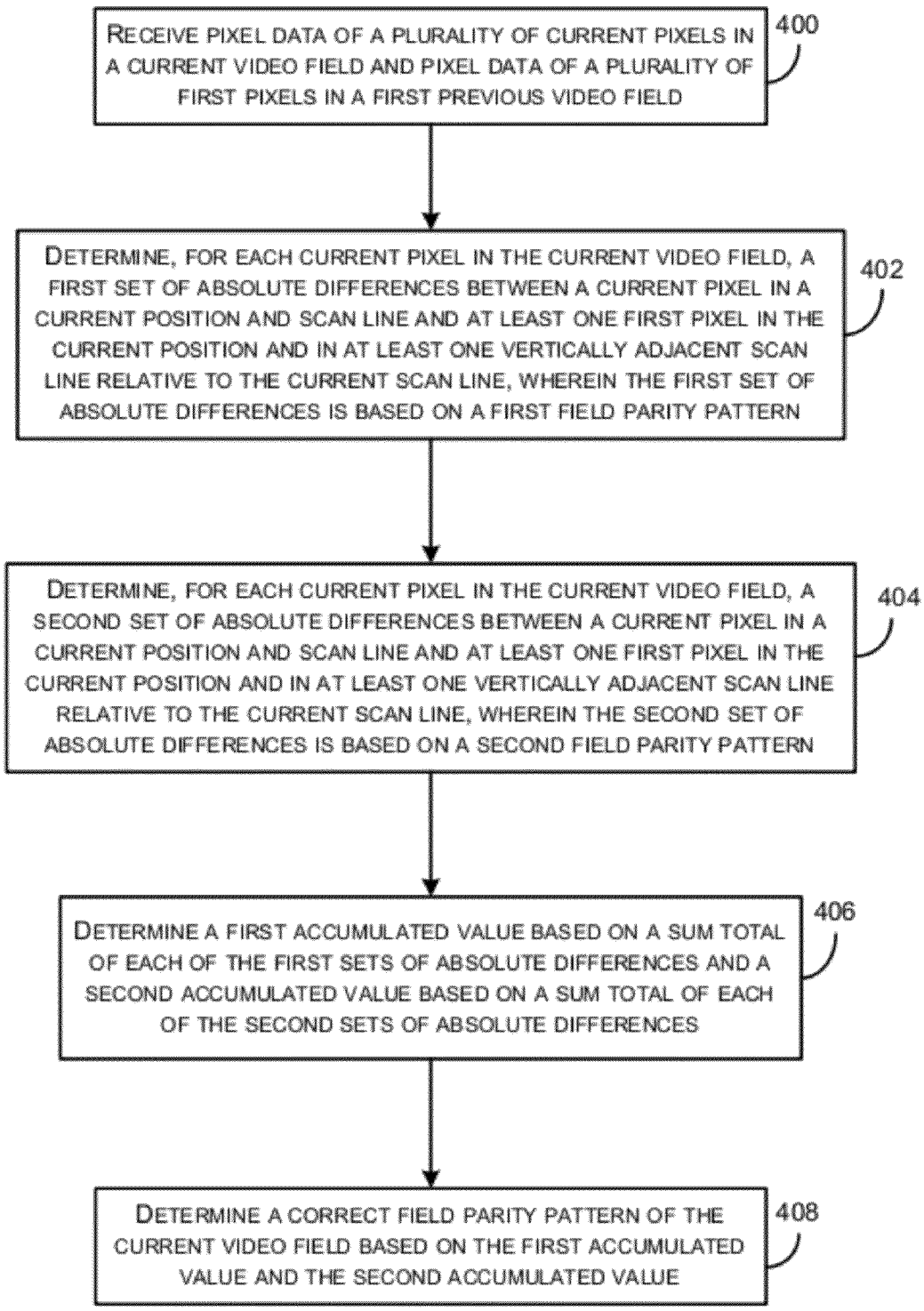
FIG. 4 is a flowchart of an exemplary method for detecting a video field parity pattern in a video signal according to one embodiment.

To describe in more detail the method and system for detecting the field parity pattern of an interlaced video signal, refer now to FIG. 3 and FIG. 4. FIG. 3 is an exemplary system for detecting the field parity pattern of a video signal according to one embodiment, and FIG. 4 is a flowchart illustrating an exemplary process for detecting the field parity pattern of a video signal according to one embodiment. Referring to FIG. 3 and FIG. 4, the process begins by receiving pixel data of a plurality of current pixels in a current video field, and pixel data of a plurality of first pixels in a first previous video field, wherein the first previous video field immediately precedes the current video field and together form an image frame (block 400). According to one embodiment, the system 30 includes means for receiving the pixel data of the plurality of current pixels and the pixel data of the plurality of first pixels. For example, the system can include 30 at least two line buffers 34a, 34b configured for performing this function.

Figures 1A, 1B:
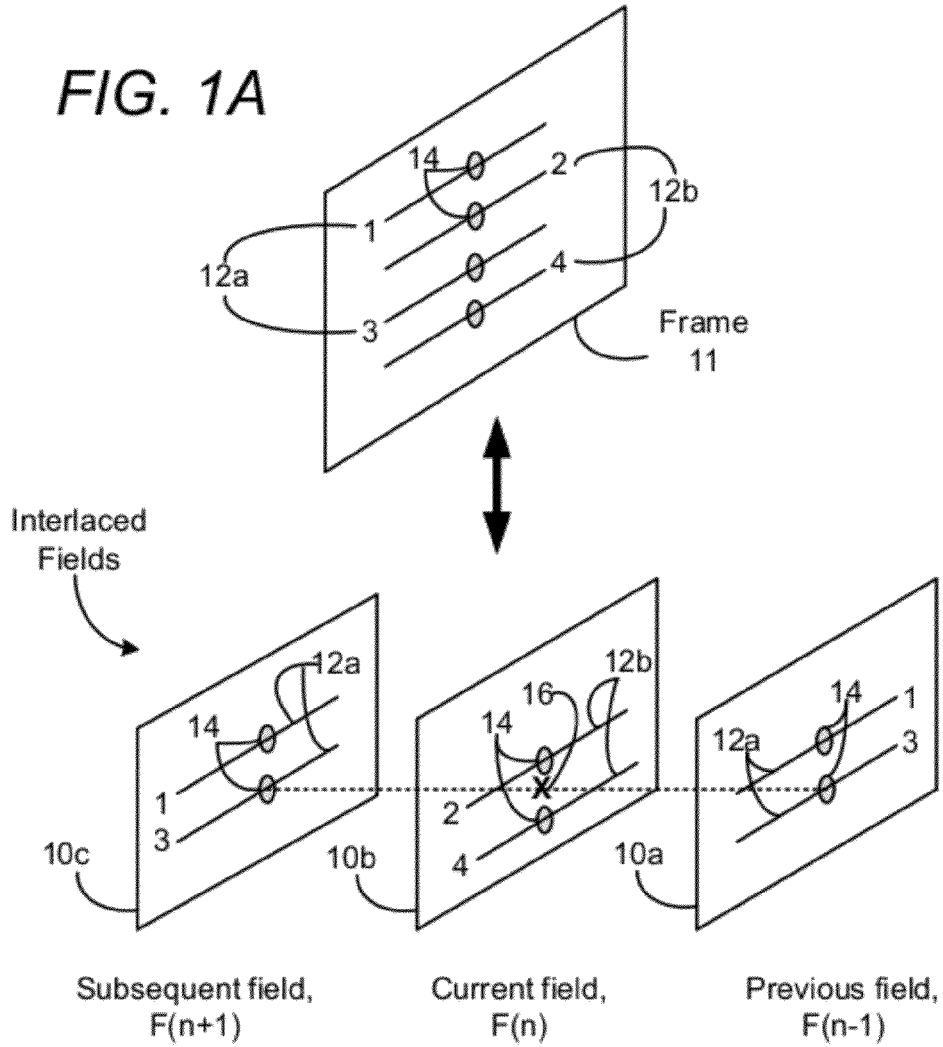
FIG. 1A and FIG. 1B depict an exemplary image frame and a plurality of video fields forming the image frame, respectively, according to one embodiment.
Figure 1C:
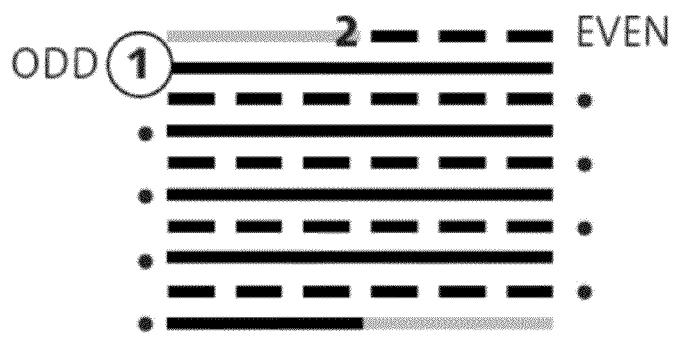
FIG. 1C-FIG. 1E depict exemplary scan line arrangements in an image frame based on various video signal formats according to one embodiment.
Figure 1D:
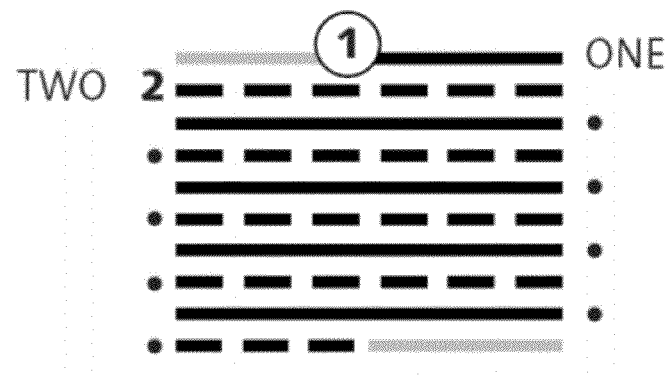
Figure 1E:
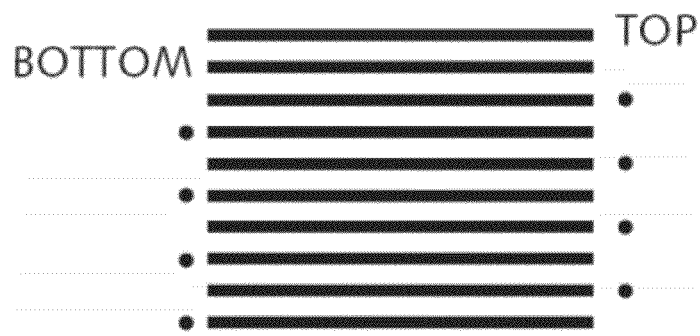

According to an exemplary embodiment, a first line buffer 34a is configured for receiving and storing the pixel data from the plurality of current pixels in scan lines of the current video field, e.g., 10b (FIG. 1B), and a second line buffer 34b is configured for receiving and storing pixel data from the plurality of first pixels in scan lines of the first previous video field 10a. According to one embodiment, the system 30 includes a field parity determination unit 300 that is configured for receiving the pixel data from the first 34a and second 34b line buffers and for detecting the field parity pattern of the video signal based on the received pixel data in the manner described generally above.

In one embodiment, the process continues by determining, for each of the plurality of current pixels in the current video field 10b, a first set of absolute differences between a current pixel in a current position in a current scan line and at least one first pixel in the current position in at least one vertically adjacent scan line relative to the current scan line, wherein the first set of absolute differences is based on a first field parity pattern (block 402). In addition, the process includes determining, for each of the plurality of current pixels in the current video field 10b, a second set of absolute differences between a current pixel in a current position in a current scan line and at least one first pixel in the current position in at least one vertically adjacent scan line relative to the current scan line, wherein the second set of absolute differences is based on a second field parity pattern (block 404). According to an exemplary embodiment, the system 30 includes means for making these determinations. For example, the field parity determination unit 300 can include an absolute difference calculation unit 310 configured for determining the first and second set of absolute differences based on the first and second field parity patterns, respectively.

As stated above, the correct FPP of the interlaced video signal 40 is either the first FPP or the second FPP. In one exemplary embodiment, shown in FIG. 5A, the current video field 10b includes pixels in at least a portion of a top scan line of the image frame 11 and the first previous video field 10a includes pixels in at least a portion of a bottom scan line of the image frame 11 when the first FPP is assumed. Conversely, when the second FPP is assumed, shown in FIG. 5B, the current video field 10b includes pixels in at least a portion of the bottom scan line of the image frame 11 and the first previous video 10a field includes pixels in at least a portion of the top scan line of the image frame 11.

Based on this arrangement, when determining the first set of absolute differences, the absolute difference calculation unit 310, accordingly to an exemplary embodiment, can be configured for determining the absolute difference between a current pixel in a current position in the first scan line and a first pixel in the current position in a scan line of the first previous field 10a directly below the first scan line of the current video field 10b for each of the plurality of current pixels in the first scan line of the current video field 10b. For example, in FIG. 5A, the absolute difference calculation unit 310 can determine the absolute difference between pixel "AA" in the current field 10b and pixel "A" in the first previous field 10a. Moreover, the absolute difference calculation unit 310 can determine, for each of the plurality of current pixels in a scan line after the first scan line of the current video field 10b, an absolute difference between a current pixel, e.g., pixel "BB," in a current position in a current scan line and a first pixel, e.g., pixel "A," in the current position in a scan line of the first previous field 10a directly above the current scan line of the current video field 10b, and an absolute difference between the current pixel (pixel BB) and another first pixel, e.g., pixel "B," in the current position in a scan line of the first previous field 10a directly below the current scan line of the current video field 10b.

Similarly, when determining the second set of absolute differences, the absolute difference calculation unit 310, accordingly to an exemplary embodiment, can be configured for determining the absolute difference between a current pixel in a current position in the last scan line and a first pixel in the current position in a scan line of the first previous field 10a directly above the first scan line of the current video field 10b for each of the plurality of current pixels in the last scan line of the current video field 10b. For example, in FIG. 5B, the absolute difference calculation unit 310 can determine the absolute difference between pixel "CC" in the current field 10b and pixel "C" in the first previous field 10a. Moreover, the absolute difference calculation unit 310 can determine, for each of the plurality of current pixels in a scan line before the last scan line of the current video field 10b, an absolute difference between a current pixel, e.g., pixel "BB," in a current position in a current scan line and a first pixel, e.g., pixel "B," in the current position in a scan line of the first previous field 10a directly above the current scan line of the current video field 10b, and an absolute difference between the current pixel (pixel BB) and another first pixel, e.g., pixel "C," in the current position in a scan line of the first previous field 10a directly below the current scan line of the current video field 10b. According to an embodiment, the absolute difference calculation unit 310 can be a standard subtractor logic circuit will known to those skilled in the art of video signal processing in general, and more particularly, of video signal de-interlacing techniques, where determining the difference between pixel values is a common and standard practice. The standard subractor logic circuit can comprise XOR gates, NOT gates, and/or AND gates, and is typically configured to receive at least two input values (the minuend and one or more subtrahends) and to output a difference (D), i.e. an absolute value, and a borrow. Accordingly, in an embodiment, the absolute difference calculation unit 310, implemented as a standard and well known substractor logic circuit, can receive two inputs corresponding to the current pixel and the first pixel, and produce as an output the absolute value of the difference between the two inputs.

Referring again to FIG. 4, when the first and second sets of absolute differences is determined, the process continues by determining a first accumulated value based on a sum total of each of the first set of absolute differences and a second accumulated value based on a sum total of each of the second set of absolute differences (block 406). According to an exemplary embodiment, the system 30 includes means for making these determinations. For example, the field parity determination unit 300 can include an absolute difference accumulation unit 320 configured for determining the first and second accumulated values based on the sum totals of each of the first and second sets of absolute differences, respectively.

According to one embodiment, the absolute difference accumulation unit 320 is configured to accumulate the first and second sets of absolute differences for each pixel in the current video field 10b on a field by field basis. Therefore, for each input video field, two accumulated values are calculated, where the first accumulated value is associated with the first FPP, and where the second accumulated value is associated with the second FPP. According to an embodiment, the absolute difference accumulation unit 320 can be implemented as a standard adder logic circuit will known to those skilled in the art of video signal processing in general, and more particularly, of video signal de-interlacing techniques, where determining a sum of values is a common and standard practice. The standard adder circuit can comprise XOR, OR, NAND and/or AND logic gates, and is typically configured to receive at least two input values (operands) and to output a sum. Accordingly, in an embodiment, the absolute difference accumulation unit 320, implemented as a standard and well known adder logic circuit, can be configured to receive the first set of differences as inputs, and to produce as an output the first accumulated value as the sum of the first set of differences. Similarly, the second accumulated value can be produced as an output when the accumulation unit 320 receives the second set of differences as inputs.

When the first and second accumulated values are determined, the process continues by determining a correct field parity pattern of the current video field based on the first accumulated value and the second accumulated value (block 408). According to an exemplary embodiment, the system 30 includes means for determining the correct field parity pattern of the current video field based on the first accumulated value and the second accumulated value. For example, the field parity determination unit 300 can include a field parity pattern detection unit 330 configured for performing this function.

In one embodiment, the field parity detection unit 330 determines the field parity pattern of the current input video field 10b by comparing the first accumulated value (AV1) and the second accumulated value (AV2) for the current video field 10b and applying a set of conditions or decision rules through a state machine. For example, the first FPP is more likely to be correct when the following condition is satisfied:

(AV2>AV1+T) and/or (AV2>AV1×F), and the second FPP is more likely to be correct when the following condition is satisfied:

(AV1>AV2+T) and/or (AV1>AV2×F), where T is a pre-determined threshold value with a positive value and F is a pre-determined field parity factor with a value larger than 1. According to one embodiment, the threshold value T can range from approximately 2×H×W to approximately 5×H×W, where H and W are the height and the width, respectively, of the video field in terms of the number of pixels. For example, for NTSC (480i), H=240 and W=720, while for PAL (576i), H=288 and W=720. The field parity factor, F, can range from approximately 1.1 to 1.6.

According to an exemplary embodiment, other conditions and decision rules can be applied to increase the reliability and robustness of the determined correct field parity pattern. For example, the first and second accumulated values of current video field 10b can be compared with the first and second accumulated values of the first previous video field 10a and at least one video field prior to the first previous video field. If the first accumulated values associated with the first FPP exhibit more fluctuations and oscillations than the second accumulated values associated with the second FPP, then the first FPP can be deemed to be less likely to be correct then the second FPP.

In another embodiment, the absolute difference accumulation unit 300 can divide the current video field 10b into a pre-determined number of equal or unequal portions and calculate the accumulated differences for each portion of the divided video field 10b. The field parity detection unit 330 can then determine the FPP for each portion of the current video field 10b applying the conditions and decision rules. In one embodiment, the field parity detection unit 330 can determine the correct FPP for the entire current video field 10b when the conditions and decision rules are satisfied for all or most of the portions of the current video field 10b.

According to another embodiment, the field parity detection unit 330 can apply certain degrees of hysteresis property to increase the reliability and robustness of the determined correct FPP. For example, the field parity detection unit 330 can assume that a current FPP is correct until indications are detected suggesting otherwise, i.e., conditions and decision rules are satisfied for the alternative FPP, for a pre-determined number of consecutive input video fields. The value of the pre-determined number of consecutive input video fields can be a design parameter that can be a compromise between the reliability and robustness of the determined correct FPP, and the delay for the correction of the FPP. For example, a larger value of the pre-determined number can result in a more reliable and robust determination with a longer delay for the correction of the FPP, while a smaller value of the pre-determined number can result in a less reliable and robust determination with a shorter delay for the correction of the FPP.

In one embodiment, when none of the conditions and/or decision rules are satisfied, i.e., the correct FPP is just as likely to be the first FPP as the second FPP, the field parity detection unit 330 can conclude that the correct FPP of the current video field 10b is undetermined, and continue by processing the next video field 10c.

As stated above, when an interlaced composite video signal is transmitted, the field parity information is typically embedded in the vertical and horizontal synchronization signals that are transmitted with the video signal. When the video signal is received, the vertical and horizontal synchronization signal is extracted from the composite video signal, and the field parity signal can be detected from the composite synchronization signal. According to one embodiment, the detected field parity signal is an assumed correct FFP for the current video field 10b.

According to one embodiment, the field parity determination unit 300 can include a field parity generation unit 350 that is configured for generating a local field parity signal of the current video field 10b when the field parity signal detected from the composite synchronization signal is unavailable or unreliable. The local field parity signal assigns one of the two FPPs as the assumed correct FPP for the current video field 10b based on its initial setting.

When the field parity detection unit 330 determines that either the first or the second FPP is the correct FPP, e.g., because the conditions and decision rules indicating that determination are satisfied, the field parity detection unit 330 can transmit, in one embodiment, an indication identifying the determined correct FPP to a field parity correction unit 340 included in the field parity determination unit 300. The field parity correction unit 340 is configured to compare the assumed correct FPP to the determined correct FPP. In one embodiment, when the determined correct FPP is different from the assumed correct FPP, the field parity correction unit 340 is configured to change the assumed correct FPP to the determined correct FPP. The correct FPP signal is then outputted by the field parity correction unit 340.

According to another embodiment, the field parity detection unit 330 can be configured to compare the assumed correct FPP to the determined correct FPP. When the determined FPP differs from the assumed FPP, the field parity detection unit 330 can output an FPP toggle signal to the field parity correction unit 340, which corrects the field parity of the current 10b and subsequent 10c video fields. The correct FPP signal is then outputted by the field parity correction unit 340.

According to an exemplary embodiment, the correct FPP signal produced by the field parity determination unit 300 can be used by a de-interlacer, a format converter, and/or another video processing block for the production, distribution, transmission, reception, scan format conversion, and display of the interlaced video signal 40. In particular, the correct FPP signal can be used to process and display the interlaced video signal 40 substantially without the visual artifacts typically present when the incorrect FPP signal is used.

Figure 6:
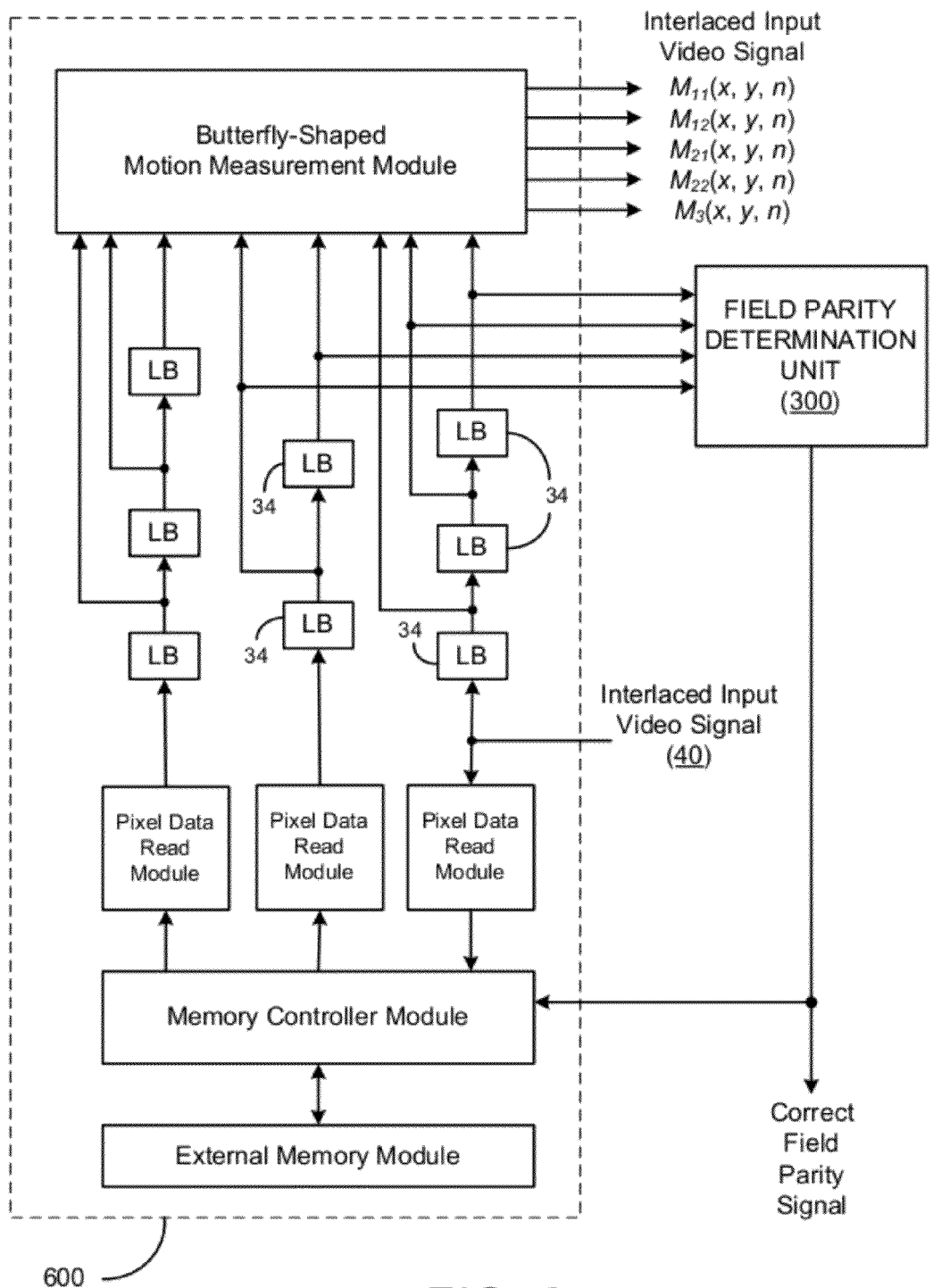
FIG. 6 is a block diagram of an exemplary motion detection unit according to one embodiment.

For example, the correct FPP signal produced by the field parity determination unit 300 can be used by a motion detection unit in a de-interlacer. An exemplary motion detection unit is described in commonly assigned U.S. Pat. No. 7,616,693 issued on Nov. 11, 2009, entitled "Method and System for Detecting Motion between Video Field of Same and Opposite Parity from an Interlaced Video Source." In one embodiment, shown in FIG. 6, the field parity determination unit 300 can be integrated with the motion detection unit 600 so that line buffers 34 and field buffers can be shared and the cost and complexity of the system can be greatly reduced.

According to aspects of an exemplary embodiment, a field parity determination unit 300 is configured to determine the correct FPP of the interlaced video field by analyzing absolute differences between pixels in vertically adjacent scan lines in a video frame when a first FPP is assumed and when a second FPP is assumed. In one embodiment, absolute differences between pixels in vertically adjacent scan lines in temporally adjacent video fields are calculated assuming a first FPP and assuming a second FPP. The absolute difference values calculated assuming the first FPP are then accumulated and compared to the accumulated absolute difference values calculated assuming the second FPP. According to an exemplary embodiment, when one of the accumulated absolute difference values is significantly less than the other, the FPP associated with the significantly smaller accumulated absolute difference value is most likely the correct FPP of the interlaced video signal 40.

In this manner, a field parity signal extracted from an interlaced video signal 40 can be continuously compared to the correct FPP determined by the field parity determination unit 300, and corrected, when necessary. In one embodiment, the field parity signal from an interlaced input video signal can be locally generated if the corresponding field parity signal extracted from the interlaced video signal 40 is either unavailable or unreliable.

It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for detecting a correct video field parity pattern in a video signal comprising a plurality of interlaced video fields, wherein each video field includes a plurality of pixels located in a plurality of positions in a plurality of scan lines, the method comprising:

receiving, by at least two line buffers, pixel data of a plurality of current pixels in a current video field, and pixel data of a plurality of first pixels in a first previous video field, wherein the first previous video field immediately precedes the current video field and together form an image frame;

determining, by a field parity determination circuit, for each of the plurality of current pixels in the current video field, a first set of absolute differences between a current pixel in a current position in a current scan line and at least one first pixel in the current position in at least one vertically adjacent scan line relative to the current scan line, wherein the first set of absolute differences is based on a first field parity pattern;

determining, by the field parity determination circuit, for each of the plurality of current pixels in the current video field, a second set of absolute differences between a current pixel in a current position in a current scan line and at least one first pixel in the current position in at least one vertically adjacent scan line relative to the current scan line, wherein the second set of absolute differences is based on a second field parity pattern;

determining by the field parity determination circuit, a first accumulated value based on a sum total of each of the first set of absolute differences and a second accumulated value based on a sum total of each of the second set of absolute differences; and determining by the field parity determination circuit, a correct field parity pattern of the current video field based on the first accumulated value and the second accumulated value by:
at least one of determining a first sum of the first accumulated value and a threshold value and determining a first product of the first accumulated value and a field parity factor; and
determining the correct field parity pattern of the current video field to be the first field parity pattern when the second accumulated value is greater than at least one of the determined first sum and the determined first product.

2. The method of claim 1 wherein the current video field includes pixels in at least a portion of a top scan line of the image frame and the first previous video field includes pixels in at least a portion of a bottom scan line of the image frame when the first field parity pattern is assumed, and wherein the current video field includes pixels in at least a portion of the bottom scan line of the image frame and the first previous video field includes pixels in at least a portion of the top scan line of the image frame when the second field parity pattern is assumed.

3. The method of claim 2 wherein determining the first set of absolute differences includes:

for each of the plurality of current pixels in a first scan line of the current video field, determining an absolute difference between a current pixel in a current position in the first scan line and a first pixel in the current position in a scan line of the first previous field directly below the first scan line of the current video field; and for each of the plurality of current pixels in a scan line after the first scan line of the current video field, determining an absolute difference between a current pixel in a current position in a current scan line and a first pixel in the current position in a scan line of the first previous field directly above the current scan line of the current video field, and an absolute difference between the current pixel and another first pixel in the current position in a scan line of the first previous field directly below the current scan line of the current video field.

4. The method of claim 2 wherein determining the second set of absolute differences includes:

for each of the plurality of current pixels in a last scan line of the current video field, determining an absolute difference between a current pixel in a current position in the last scan line and a first pixel in the current position in a scan line of the first previous field directly above the last scan line of the current video field; and for each of the plurality of current pixels in a scan line before the last scan line of the current video field, determining an absolute difference between a current pixel in a current position in a current scan line and a first pixel in the current position in a scan line of the first previous field directly above the current scan line of the current video field, and an absolute difference between the current pixel and another first pixel in the current position in a scan line of the first previous field directly below the current scan line of the current video field.

5. The method of claim 1 wherein determining the correct field parity pattern of the current video field includes:

at least one of determining a second sum of the second accumulated value and the threshold constant and determining a second product of the second accumulated value and the field parity factor; and determining the correct field parity pattern of the current video field to be the second field parity pattern when the first accumulated value is greater than at least one of the determined second sum and the determined second product.

6. The method of claim 1 wherein determining the correct field parity pattern of the current video field includes:

comparing the first accumulated value and the second accumulated value of the current video field with first and second accumulated values of the first previous video field and at least one video field prior to the first previous video field; and determining the correct field parity pattern based on the comparison.

7. The method of claim 1 further comprising:

changing an assumed correct field parity pattern of the current video field to the determined correct field parity pattern when the determined correct field parity pattern differs from the assumed video field parity pattern.

8. A system for detecting a correct video field parity pattern in a video signal comprising a plurality of interlaced video fields, wherein each video field includes a plurality of pixels located in a plurality of positions in a plurality of scan lines, the system comprising:

means for receiving pixel data of a plurality of current pixels in a current video field, and pixel data of a plurality of first pixels in a first previous video field, wherein the first previous video field immediately precedes the current video field and together form an image frame;

means for determining, for each of the plurality of current pixels in the current video field, a first set of absolute differences between a current pixel in a current position in a current scan line and at least one first pixel in the current position in at least one vertically adjacent scan line relative to the current scan line, wherein the first set of absolute differences is based on a first field parity pattern, wherein said means is further configured for determining a second set of absolute differences between a current pixel in a current position in a current scan line and at least one first pixel in the current position in at least one vertically adjacent scan line relative to the current scan line, wherein the second set of absolute differences is based on a second field parity pattern;

means for accumulating each of the first set of absolute differences to generate a first accumulated value and for accumulating each of the second set of absolute differences to generate a second accumulated value; and means for detecting a correct field parity pattern of the current video field based on the first accumulated value and the second accumulated value by:

at least one of determining a first sum of the first accumulated value and a threshold value and determining a first product of the first accumulated value and a field parity factor; and determining the correct field parity pattern of the current video field to be the first field parity pattern when the second accumulated value is greater than at least one of the determined first sum and the determined first product.

9. A system for detecting a correct video field parity pattern in a video signal comprising a plurality of interlaced video fields, wherein each video field includes a plurality of pixels located in a plurality of positions in a plurality of scan lines, the system comprising:

at least two one line buffers configured for receiving pixel data of a plurality of current pixels in a current video field, and pixel data of a plurality of first pixels in a first previous video field, wherein the first previous video field immediately precedes the current video field and together form an image frame;

an absolute difference calculation unit configured for determining, for each of the plurality of current pixels in the current video field, a first set of absolute differences between a current pixel in a current position in a current scan line and at least one first pixel in the current position in at least one vertically adjacent scan line relative to the current scan line, wherein the first set of absolute differences is based on a first field parity pattern, and for determining, for each of the plurality of current pixels in the current video field, a second set of absolute differences between a current pixel in a current position in a current scan line and at least one first pixel in the current position in at least one vertically adjacent scan line relative to the current scan line, wherein the second set of absolute differences is based on a second field parity pattern;

an accumulation unit configured for determining a first accumulated value based on a sum total of each of the first set of absolute differences and a second accumulated value based on a sum total of each of the second set of absolute differences; and a field parity pattern detection unit configured for determining a correct field parity pattern of the current video field based on the first accumulated value and the second accumulated value by:

at least one of determining a first sum of the first accumulated value and a threshold value and determining a first product of the first accumulated value and a field parity factor; and determining the correct field parity pattern of the current video field to be the first field parity pattern when the second accumulated value is greater than at least one of the determined first sum and the determined first product.

10. The system of claim 9 wherein the current video field includes pixels in at least a portion of a top scan line of the image frame and the first previous video field includes pixels in at least a portion of a bottom scan line of the image frame when the first field parity pattern is assumed, and wherein the current video field includes pixels in at least a portion of the bottom scan line of the image frame and the first previous video field includes pixels in at least a portion of the top scan line of the image frame when the second field parity pattern is assumed.

11. The system of claim 10 wherein the absolute difference calculation unit is configured for determining the first set of absolute differences, by determining, for each of the plurality of current pixels in a first scan line of the current video field, an absolute difference between a current pixel in a current position in the first scan line and a first pixel in the current position in a scan line of the first previous field directly below the first scan line of the current video field, and for determining, for each of the plurality of current pixels in a scan line after the first scan line of the current video field, an absolute difference between a current pixel in a current position in a current scan line and a first pixel in the current position in a scan line of the first previous field directly above the current scan line of the current video field, and an absolute difference between the current pixel and another first pixel in the current position in a scan line of the first previous field directly below the current scan line of the current video field.

12. The system of claim 10 wherein the absolute difference calculation unit is configured for determining the second set of absolute differences, by determining, for each of the plurality of current pixels in a last scan line of the current video field, an absolute difference between a current pixel in a current position in the last scan line and a first pixel in the current position in a scan line of the first previous field directly above the last scan line of the current video field, and for determining, for each of the plurality of current pixels in a scan line before the last scan line of the current video field, an absolute difference between a current pixel in a current position in a current scan line and a first pixel in the current position in a scan line of the first previous field directly above the current scan line of the current video field, and an absolute difference between the current pixel and another first pixel in the current position in a scan line of the first previous field directly below the current scan line of the current video field.

13. The system of claim 9 wherein the field parity detection unit is further configured for at least one of determining a second sum of the second accumulated value and the threshold constant and determining a second product of the second accumulated value and the field parity factor, and for determining the correct field parity pattern of the current video field to be the second field parity pattern when the first accumulated value is greater than at least one of the determined second sum and the determined second product.

14. The system of claim 9 wherein the field parity detection unit is configured for comparing the first accumulated value and the second accumulated value of the current video field with first and second accumulated values of the first previous video field and at least one video field prior to the first previous video field, and for determining the correct field parity pattern based on the comparison.

15. The system of claim 9 further comprising a field parity correction unit configured for changing an assumed field parity pattern of the current video field to the determined correct field parity pattern when the determined correct field parity pattern differs from the assumed video field parity pattern.

* * * * *